United States Patent
Kim

(10) Patent No.: US 8,421,946 B2
(45) Date of Patent: Apr. 16, 2013

(54) BACKLIGHT UNIT AND LIQUID CRYSTAL DISPLAY DEVICE HAVING THE SAME

(75) Inventor: Sung Woo Kim, Gyeongsan-si (KR)

(73) Assignee: LG Display Co., Ltd., Seoul (KR)

( * ) Notice: Subject to any disclaimer, the term of this patent is extended or adjusted under 35 U.S.C. 154(b) by 487 days.

(21) Appl. No.: 12/334,288

(22) Filed: Dec. 12, 2008

(65) Prior Publication Data

US 2009/0237585 A1 Sep. 24, 2009

(30) Foreign Application Priority Data

Mar. 18, 2008 (KR) .......................... 10-2008-0025086

(51) Int. Cl.
*G02F 1/1333* (2006.01)

(52) U.S. Cl.
USPC .............................................. 349/58; 349/65

(58) Field of Classification Search .................. None
See application file for complete search history.

(56) References Cited

U.S. PATENT DOCUMENTS

| | | | |
|---|---|---|---|
| 6,530,669 B2* | 3/2003 | Toyoda | 362/610 |
| 6,992,736 B2* | 1/2006 | Saito et al. | 349/58 |
| 2005/0094052 A1* | 5/2005 | Sakurai et al. | 349/58 |
| 2009/0128732 A1 | 5/2009 | Hamada | |

FOREIGN PATENT DOCUMENTS

| | | |
|---|---|---|
| CN | 101416101 A | 4/2009 |
| KR | 10-2005-0028873 A | 3/2005 |
| WO | WO-2007/129419 A1 | 11/2007 |

* cited by examiner

*Primary Examiner* — Lucy Chien

(74) *Attorney, Agent, or Firm* — Birch, Stewart, Kolasch & Birch, LLP

(57) ABSTRACT

A backlight unit is provided. The backlight unit includes: a bottom cover having a height difference region; a flexible printed circuit board side-contacting an inner side, the inner side corresponding to the height difference region of the bottom cover; a plurality of light emitting diodes mounted on the flexible printed circuit board; a light guide plate disposed on the same plane as the light emitting diode; and a reflective sheet attached to a bottom of the light guide plate to correspond to the height difference region of the bottom cover.

12 Claims, 3 Drawing Sheets

BACKLIGHT UNIT AND LIQUID CRYSTAL DISPLAY DEVICE HAVING THE SAME

CROSS-REFERENCE TO RELATED APPLICATIONS

The present application claims priority under 35 U.S.C. 119 and 35 U.S.C. 365 to Korean Patent Application No. 10-2008-0025086 (filed on Mar. 18, 2008), which is hereby incorporated by reference in its entirety.

BACKGROUND

The present disclosure relates to a backlight unit capable of improving light efficiency and assemblability and a liquid crystal display device having the same.

Based on rapidly developing semiconductor technologies, demands on compact and light flat display devices with high performance are drastically increased recently.

A liquid crystal display device (LCD) receiving public attention recently among the flat display devices has various advantages such as compactness, lightness, and low power consumption. That is, the LCD gradually attracts public interest as a substitute means capable of overcoming limitations of a cathode ray tube (CRT) and thus becomes widely used in almost all information processing devices that require a display unit.

The LCD injects a liquid crystal material between a color filter substrate having a common electrode and a color filter and an array substrate having a thin film transistor and a pixel electrode, and then applies respectively different electric potentials on the pixels electrode and the common electrode. Therefore, the LCD changes arrangements of liquid crystal molecules, thereby adjusting transmittance of light in order to display an image.

Since a liquid crystal display panel including the color filter substrate, the array substrate, and the liquid crystal is a light receiving device that does not emit light by itself, it includes a backlight unit at its bottom in order to provide light.

The backlight unit includes a light source, a light source housing surrounding the light source to prevent light loss, a light guide plate converting a light emitted from the light source into a plane light, a reflective sheet disposed on the rear of the light guide plate, and optical sheets disposed on the light guide plate.

The light source extensively uses a cold cathode fluorescent lamp (CCFL) having relatively less emitted heat and a long life span and also generating a white light close to a natural light. Additionally, a medium/small LCD commonly uses a light emitting diode (LED) having compactness, excellent color reproduction, and also less power consumption.

FIG. 1 is a perspective view of a related art liquid crystal display device. FIG. 2 is a cross-sectional view taken along a line I-I' of FIG. 1.

As illustrated in FIGS. 1 and 2, the related art liquid crystal display device includes a liquid crystal display panel 11 for displaying an image, a backlight unit disposed at the bottom of the liquid crystal display panel 11 to provide light, and a top case 10 surrounding the edge of the liquid crystal display panel 11 and coupled to the backlight unit.

The backlight unit includes a support main 20 having a rectangular frame, a bottom cover 70 disposed on one side of the support main 20, a light emitting diode 50 disposed on one inner side of the bottom cover 70, and a light guide plate 40 disposed on the same plane as the light emitting diode 50.

Additionally, the light emitting diode 50 is mounted on the flexible printed circuit board (FPC) 51, and optical sheets 30 are disposed on the light guide plate 40.

First and second reflective sheets 61 and 63 are disposed at a region having the light emitting diode 50 to guide light toward the light guide plate 40. Therefore, light loss can be reduced.

However, because the related art liquid crystal display device has a structure where the second reflective sheet 63 is disposed on the FPC 51 and the light guide plate 40 is disposed on the reflective sheet 63, it is difficult to assemble an outgoing side 53 of the light emitting diode 50 and an incident surface 43 of the light guide plate 40 to respectively correspond to each other. That is, if the outgoing side 53 of the light emitting diode 50 and the incident surface 43 of the light guide plate 40 are not disposed to correspond to each other, there may be a region where no light reaches and thus light efficiency can be deteriorated.

Furthermore, because a uniform interval between the incident side 43 and the FPC 51 is maintained due to the FPC 51 and the second reflective sheet 63 in the related art liquid crystal display device, its assemblability can be deteriorated if the light guide plate 40 moves freely or defective alignments occur.

SUMMARY

Accordingly, the present invention is directed to a liquid crystal display device that substantially obviates one or more of the problems due to limitations and disadvantages of the related art.

The embodiments provide a backlight unit capable of improving light efficiency and assemblability and a liquid crystal display device having the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory, and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE EMBODIMENTS

Reference will now be made in detail to the embodiments of the present disclosure, examples of which are illustrated in the accompanying drawings.

Figure 1:
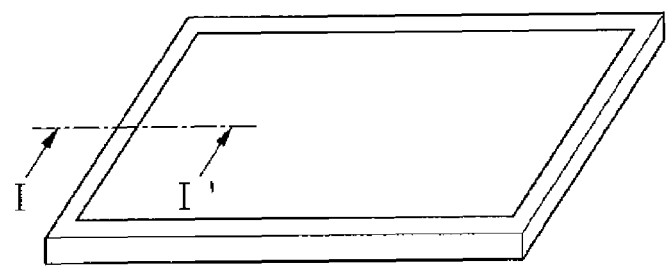
FIG. 1 is a perspective view of a related art liquid crystal display device.
Figure 2:
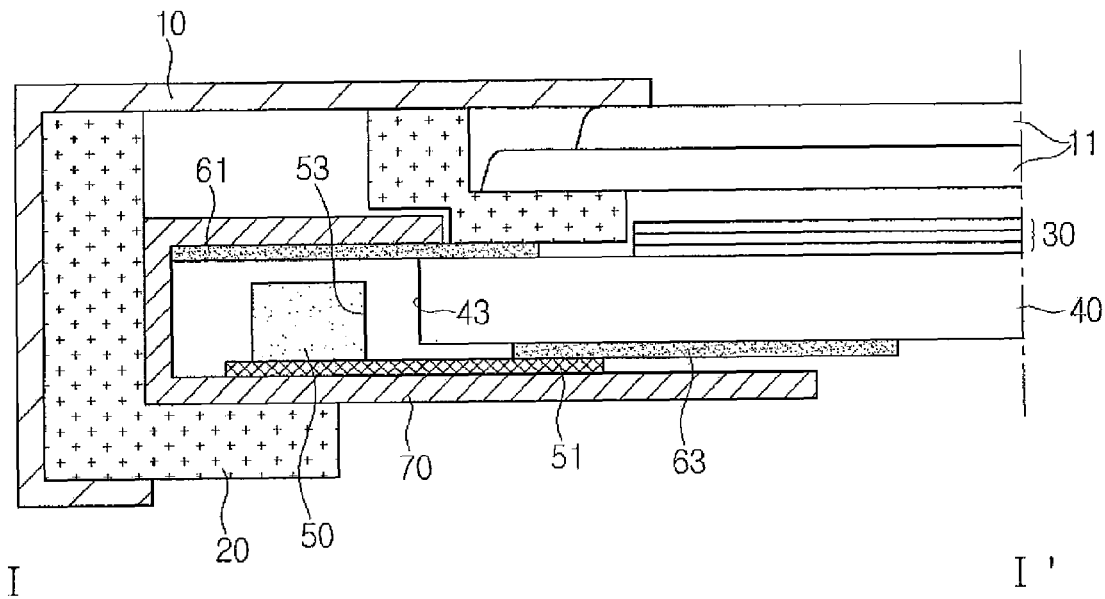
FIG. 2 is a cross-sectional view taken along a line I-I' of FIG. 1.
Figure 3:
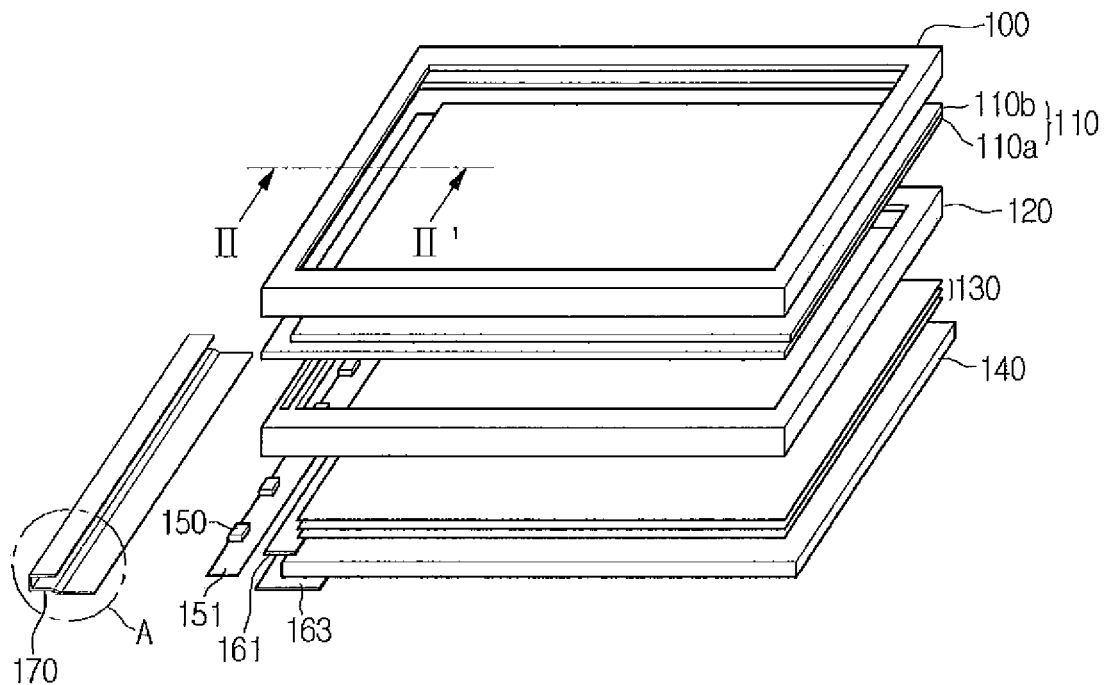
FIG. 3 is an exploded perspective view of a liquid crystal display device according to one embodiment of the present invention.
Figure 4:
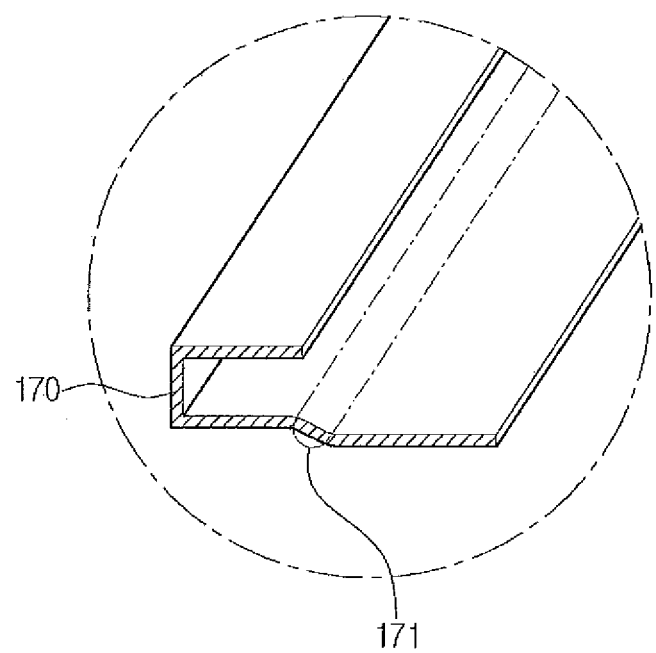
FIG. 4 is a detailed view of a region A of FIG. 3.
Figure 5:
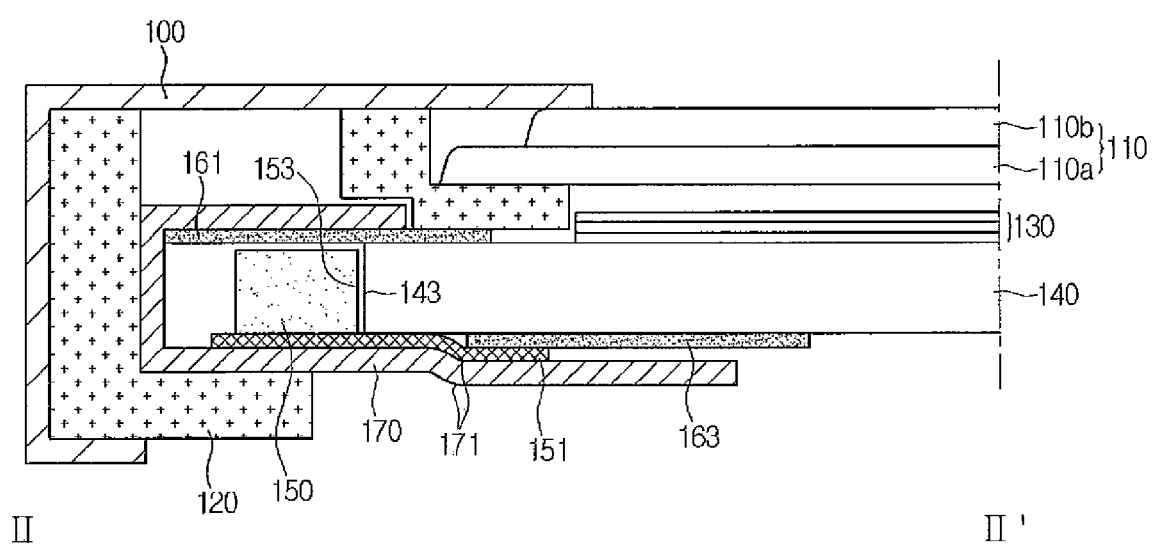
FIG. 5 is a cross-sectional view taken along a line II-II' of FIG. 3.

FIG. 3 is an exploded perspective view of a liquid crystal display device according to one embodiment of the present invention. FIG. 4 is a detailed view of a region A of FIG. 3. FIG. 5 is a cross-sectional view taken along a line II-II' of FIG. 3.

As illustrated in FIGS. 3 to 5, the liquid crystal display device according to an embodiment includes a liquid crystal display panel 110 for displaying an image, a backlight unit disposed at the rear of the liquid crystal display panel 110 to provide light, and a top case 100 surrounding the edge of the liquid crystal display panel 110.

As briefly illustrated in the drawings, the liquid crystal display panel 110 includes a thin film transistor substrate 110a having a plurality of thin film transistors (TFTs), a color filter substrate 110b disposed on the thin film transistor substrate 110a, and a liquid crystal (not shown) interposed therebetween. The color filter substrate 110b disposed on the thin film transistor substrate 110a is a substrate having R, G, and B color filters. A common electrode formed of indium tin oxide (ITO) is deposited on the R, G, and B color filters. The R, G, and B color filters display colors when light is transmitted.

Additionally, an integrated circuit (IC) chip is disposed on one end of the thin film transistor substrate 110a. The IC chip generates an image signal and a scan signal to drive the liquid crystal display device and a plurality of timing signals for applying them, and then applies the image signal and the scan signal to a gate line and a data line of the liquid crystal display panel 110.

The backlight unit disposed on the rear of the liquid crystal display panel 110 for providing light includes a support main 120 formed of a mold material with a rectangular frame, a bottom cover 170 disposed on an inner one side of the support main 120, and a plurality of light emitting diode 150 spaced a predetermined distance apart from each other in the bottom cover 170, and a light guide plate 140 disposed on the same plane as the light emitting diode 150.

A flexible printed circuit board 151 includes a flexible printed circuit board (FPC) 151 that side-contacts the inner side of the bottom cover 170. Here, the plurality of light emitting diodes 150 is disposed at predetermined intervals on the FPC 151.

A first reflective sheet 161 is disposed on the inner side of the bottom cover 170 corresponding to the FPC 151 to guide light emitted from the light emitting diode 150 toward the light guide plate 140, and a second reflective sheet 163 is disposed between the FPC 151 and the light guide plate 140. Therefore, light loss can be minimized.

The light emitting diode 150 can be realized with a combination of a white light emitting diode for emitting white light and red, green, and blue light emitting diodes for emitting red, green, and blue lights, respectively.

The FPC 151 is a circuit board where a complex circuit is formed on a flexible insulating film, and may be formed of a thermal resistance plastic film such as polyester (PET) or polyimide (PI).

The light guide plate 140 converts a line light incident from the light emitting diode 150 into a plane light. Thus, the plane light reaches a place far from the light emitting diode 150. The light guide plate 140 guides the incident light toward the liquid crystal display panel 110.

The light guide plate 140 generally has high solidity and thus is not easily modified or broken and may be formed of Polymethylmethacrylate (PMMA) having high transmittance.

The optical sheets 130 includes a diffuse sheet for diffusing light, a light collect sheet for collecting the diffused light, and a protect sheet for protecting patterns formed on the light collect sheet.

The bottom cover 170 has an open side in a direction of the light guide plate 140, and has a ' ㄴ ' form.

The bottom of the bottom cover 170 has a height difference. A bent height difference region 171 of the bottom cover 170 corresponds to one side of the second reflective sheet 163 mounted at the bottom of the light guide plate 140.

The reason that the height difference region 171 is formed on the bottom of the bottom cover 170 is that the outgoing side 153 of the light emitting diode 150 and an incident side 143 of the light guide plate 140 face each other to improve light efficiency.

The FPC 151 side-contacts the inner side of the bottom cover 170 corresponding to the height difference region 171. The height difference region 171 has a round form to prevent damage of the FPC 151.

The height difference region 171 is bent toward the bottom direction of the bottom cover 170 by the thickness of the FPC 151. Accordingly, a portion of the bottom of the light guide plate 140 side-contacts the FPC 151.

The outgoing side 153 of the light emitting diode 150 and the incident side of the light guide plate 140 face each other because of the height difference region 171 of the bottom cover 170.

Although the outgoing side 153 of the light emitting diode 150 and the incident side 143 of the light guide plate 140 have predetermined intervals therebetween, the outgoing side 153 and the incident side 143 may side-contact each other in order to maximize light efficiency.

Although the above embodiment is described being limited to the structure of the bottom cover 170 in the liquid crystal display device embodiment, a height difference structure of the bottom cover 170 for allowing the outgoing side 153 of the light emitting diode 150 and the incident side 143 of the light guide plate 140 to face each other may be modified.

The above liquid crystal display device allows the outgoing side 153 of the light emitting diode 150 and the incident side 143 of the light guide plate 140 to face each other by using the bottom cover 170 having the height difference region 171. Therefore, light efficiency can be maximized.

Moreover, the present invention includes the bottom cover 170 having the height difference region 171 in order to allow the bottom portion of one side of the light guide plate 140 corresponding to the light emitting diode 150 and the FPC 151 to side-contact. Therefore, assemblability deterioration of the related art liquid crystal display device (due to light guide plate movement, defective alignments, etc.) can be improved.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit comprising:
  a bottom cover having a height difference region, the height difference region dividing the bottom cover into a first region and a second region;
  a flexible printed circuit board side-contacting an inner side, the inner side corresponding to the height difference region of the bottom cover;
  a plurality of light emitting diodes mounted on the flexible printed circuit board;
  a light guide plate disposed on one side of the light emitting diode; and
  a first reflective sheet attached to a bottom of the light guide plate to correspond to the second region of the bottom cover,
  wherein the bottom cover includes a first part extending from the bottom cover, and a second part extending from the first part, the second part overlapping with the light emitting diode,
  wherein a bottom of one side of the light guide plate side-contacts the flexible printed circuit board, and the one side of the light guide plate corresponds to the light emitting diode,
  wherein the first region overlapped with the flexible printed circuit board corresponds to the light emitting diode,
  wherein the second region overlapped with the flexible printed circuit board and the reflective sheet corresponds to an opposite side of the light emitting diode, and
  wherein the height difference region has a height difference between the first region and the second region in order to dispose the reflective sheet between the light guide plate and the flexible printed circuit board.

2. The backlight unit of claim 1, wherein a light outgoing side of the light emitting diode and a light incident side of the light guide plate side-contact each other.

3. The backlight unit of claim 1, wherein the height difference region is bent toward a bottom of the bottom cover by a thickness of the flexible printed circuit board.

4. The backlight unit of claim 1, wherein the height difference region has a round form.

5. A liquid crystal display device comprising:
  a bottom cover including a height difference region, the height difference region dividing the bottom cover into a first region and a second region;
  a flexible printed circuit board side-contacting an inner side corresponding to the height difference region of the bottom cover;
  a liquid crystal display panel displaying an image by using light emitted from the light emitting diode;
  a plurality of light emitting diodes mounted on the flexible printed circuit board;
  a light guide plate disposed on one side of the light emitting diode;
  a reflective sheet attached to a bottom of the light guide plate to correspond to the second region of the bottom cover; and
  a liquid crystal display panel displaying an image by using a light emitted from the light emitting diode,
  wherein the bottom cover includes a first part extending from the bottom cover, and a second part extending from the first part, the second part overlapping with the light emitting diode,
  wherein a bottom of one side of the light guide plate side-contacts the flexible printed circuit board, and the one side of the light guide plate correspond corresponds to the light emitting diode,
  wherein the first region overlapped with the flexible printed circuit board corresponds to the light emitting diode,
  wherein the second region overlapped with the flexible printed circuit board and the reflective sheet corresponds to an opposite side of the light emitting diode, and
  wherein the height difference region has a height difference between the first region and the second region in order to dispose the reflective sheet between the light guide plate and the flexible printed circuit board.

6. The liquid crystal display device of claim 5, wherein a light outgoing side of the light emitting diode and a light incident side of the light guide plate side-contact each other.

7. The liquid crystal display device of claim 5, wherein the height difference region is bent toward a bottom of the bottom cover by a thickness of the flexible printed circuit board.

8. The liquid crystal display device of claim 5, wherein the height difference region has a round form.

9. The backlight unit of claim 1, further comprising:
  a second reflective sheet attached to a bottom surface of the second part.

10. The backlight unit of claim 9, wherein an edge portion of the second reflective sheet is disposed on the light guide plate.

11. The liquid crystal display device of claim 5, further comprising:
  a second reflective sheet attached to a bottom surface of the second part.

12. The liquid crystal display device of claim 11, wherein an edge portion of the second reflective sheet is disposed on the light guide plate.

* * * * *